United States Patent
Xiang et al.

(10) Patent No.: US 12,381,487 B2
(45) Date of Patent: Aug. 5, 2025

(54) HIGH SIDE ACTIVE CLAMP CHARGING CIRCUIT

(71) Applicant: Astec International Limited, Kowloon (HK)

(72) Inventors: Mao Xi Xiang, Shenzhen (CN); Linjun Yuan, Shenzhen (CN); Pei Huang, Shenzhen (CN); Youri Lin, Shenzhen (CN); Xin Zhang, Shenzhen (CN)

(73) Assignee: AES Global Holdings PTE. Ltd., Singapore (SG)

( * ) Notice: Subject to any disclaimer, the term of this patent is extended or adjusted under 35 U.S.C. 154(b) by 217 days.

(21) Appl. No.: 18/259,869

(22) PCT Filed: Jan. 6, 2021

(86) PCT No.: PCT/CN2021/070449
§ 371 (c)(1),
(2) Date: Jun. 29, 2023

(87) PCT Pub. No.: WO2022/147683
PCT Pub. Date: Jul. 14, 2022

(65) Prior Publication Data
US 2024/0063721 A1 Feb. 22, 2024

(51) Int. Cl.
*H02M 3/335* (2006.01)
*H02M 1/34* (2007.01)

(52) U.S. Cl.
CPC .............................. *H02M 3/33569* (2013.01)

(58) Field of Classification Search
CPC ......... H02M 3/33538; H02M 3/33569; H02M 1/342
See application file for complete search history.

(56) References Cited

U.S. PATENT DOCUMENTS

| 7,589,571 B1 | 9/2009 | Wittenbreder |
| 10,008,948 B1 * | 6/2018 | Strijker ............. H02M 3/33553 |

(Continued)

FOREIGN PATENT DOCUMENTS

| CN | 102208873 A | 10/2011 |
| CN | 110661401 A | 1/2020 |

(Continued)

OTHER PUBLICATIONS

International Search Report & Written Opinion for PCT/CN2021/070449, mailed Oct. 11, 2021, 9 pages.

*Primary Examiner* — Sisay G Tiku

(57) ABSTRACT

A power supply comprises a transformer having a primary winding, a first switch coupled to the primary winding and to a voltage input, an active clamp circuit coupled in parallel with the primary winding, and a clamp switch control coupled to the active clamp circuit. The power supply further comprises a bootstrap circuit coupled to the clamp switch control and having a bootstrap voltage storage device coupled to the clamp switch control. A charging circuit has a resistor network configured to generate a charge voltage in response to an input voltage supplied by the primary winding. A charge voltage storage device is configured to store at least a portion of the charge voltage during the first portion of the switching cycle and to supply the at least a portion of the charge voltage to the bootstrap voltage storage device during a second portion of the switching cycle.

20 Claims, 3 Drawing Sheets

(56) References Cited

U.S. PATENT DOCUMENTS

| | | | | |
|---|---|---|---|---|
| 10,411,603 | B1* | 9/2019 | Strijker | H02M 3/33507 |
| 10,784,789 | B1* | 9/2020 | Nasir | H02M 1/08 |
| 2017/0264206 | A1* | 9/2017 | Rana | H02M 3/33569 |
| 2020/0007041 | A1* | 1/2020 | Liu | H02M 3/33507 |
| 2020/0007048 | A1* | 1/2020 | Radic | H02M 1/34 |
| 2020/0112261 | A1* | 4/2020 | Strijker | H02M 3/33592 |
| 2020/0328688 | A1* | 10/2020 | Radic | H02M 1/083 |
| 2021/0234471 | A1* | 7/2021 | Qiu | H02M 1/10 |
| 2022/0182048 | A1* | 6/2022 | Liu | H03K 17/14 |
| 2023/0246553 | A1* | 8/2023 | Zou | H02M 7/217 |
| | | | | 363/21.12 |
| 2024/0203634 | A1* | 6/2024 | Zou | H01F 27/24 |

FOREIGN PATENT DOCUMENTS

| | | | | |
|---|---|---|---|---|
| CN | 110995023 | A | 4/2020 | |
| CN | 210246599 | U | 4/2020 | |
| EP | 3633837 | A1 * | 4/2020 | H02M 1/32 |

* cited by examiner

HIGH SIDE ACTIVE CLAMP CHARGING CIRCUIT

TECHNICAL FIELD

Aspects of the disclosure are related to electronic components, and in particular to voltage conversion, and further in particular to the reduction of voltage stress.

TECHNICAL BACKGROUND

A power supply typically converts an incoming voltage into a different, output voltage. For example, a direct current (DC) input voltage may be converted to a different DC voltage for use by electronic equipment. A power supply based on forward converter topology provides DC-to-DC conversion with galvanic isolation between the input power source and the load. A transformer may be used to isolate the input power source from the load in one example. Voltage stress experienced in one or more components coupled to the primary side of the transformer may cause undesirable results such as transformer saturation or component failure.

OVERVIEW

In accordance with one aspect, a power supply comprises a power supply voltage input, a transformer having a primary winding coupled to the power supply voltage input, a first switch coupled to the primary winding and to the power supply voltage input, an active clamp circuit coupled in parallel with the primary winding and having a second switch, and a clamp switch control coupled to the second switch and having a voltage input. The power supply further comprises a bootstrap circuit coupled to the clamp switch control and having a bootstrap voltage storage device coupled to the voltage input of the clamp switch control. A charging circuit has a first voltage input coupled to the primary winding, a voltage output coupled to the bootstrap voltage storage device, and a resistor network configured to generate a charge voltage in response to an input voltage supplied to the first voltage input by the primary winding during a first portion of a switching cycle of the first switch. The charging circuit also has a charge voltage storage device coupled to the resistor network and configured to store at least a portion of the charge voltage during the first portion of the switching cycle and to supply the at least a portion of the charge voltage to the bootstrap voltage storage device via the voltage output during a second portion of the switching cycle.

In accordance with another aspect, a charging circuit for an active clamp forward converter includes the active clamp forward converter having an active switch coupled to a primary winding of a transformer, a filter circuit coupled to a secondary winding of the transformer, a high-side active clamp coupled in parallel with the primary winding, a first switch control coupled to the active switch, a second switch control coupled to the high-side active clamp, and a bootstrap circuit coupled to the second switch control. The charging circuit has a first voltage input coupled to the primary winding, a voltage output coupled to the bootstrap circuit, and a resistor network configured to generate a charge voltage in response to an input voltage supplied to the first voltage input by the primary winding during a first portion of a switching cycle of the active switch. The charging circuit also has a charge voltage storage device coupled to the resistor network and configured to store at least a portion of the charge voltage during the first portion of the switching cycle and to supply the at least a portion of the charge voltage to the bootstrap circuit via the voltage output during a second portion of the switching cycle.

In accordance with another aspect, an active clamp forward converter has a first switch control coupled to a first active switch, a transformer having a primary winding coupled to the first active switch, an active clamp coupled in parallel with the primary winding, a second switch control coupled to the active clamp, and a bootstrap circuit coupled to the second switch control. The active clamp forward converter also has a charging circuit having a first voltage input coupled to the primary winding, a voltage output coupled to the bootstrap circuit, a resistor network configured to generate a charge voltage in response to an input voltage supplied to the first voltage input by the primary winding during a first portion of a switching cycle of the first active switch, and a charge voltage storage device coupled to the resistor network. The charge voltage storage device is configured to store at least a portion of the charge voltage during the first portion of the switching cycle and to supply the at least a portion of the charge voltage to the bootstrap circuit via the voltage output during a second portion of the switching cycle.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

Figure 1:
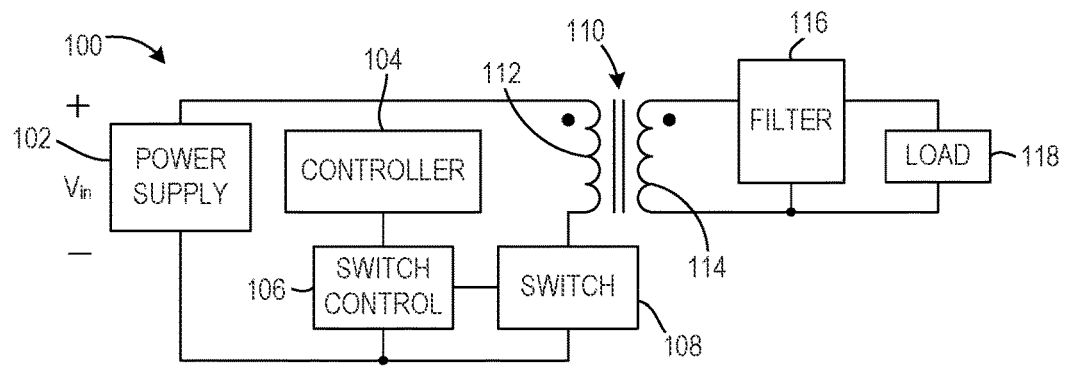
FIG. 1 illustrates a schematic block diagram of a forward converter.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

FIG. 1 illustrates a schematic block diagram of a forward converter 100, which may be used for generating controlled and isolated DC voltage from unregulated DC power supply 102. A controller 104 is coupled to a switch control 106 and operates the switch control 106 to turn on and off a switch 108 coupled to a transformer 110. On a primary side of the transformer 110, a primary winding 112 of the transformer 110 is coupled between the power supply 102 and the switch 108. On a secondary side of the transformer 110, a secondary winding 114 of the transformer 110 is coupled to a filter 116 to provide an output voltage to a load 118.

In an exemplary implementation, power supply 102 includes a DC voltage source such as one or more batteries, and switch 108 includes a controlled or active switch such as a transistor. In one embodiment, the transistor is a metal-oxide-semiconductor field-effect transistor (MOSFET). The controller 104, such as a microcontroller, is programmed to operate the switch control 106 such as an operational amplifier to turn the switch on and off to control the current flowing through the transformer 110 from the power supply 102. The secondary winding 114 receives a voltage from the primary winding 112 in a ratio of the number of turns of the secondary winding 114 to the number of turns of the primary winding 112. The secondary winding voltage is supplied to the filter 116 including, in a basic implementation, a pair of diodes, an inductor, and a capacitor.

During a positive flow of current from the power supply 102 through the primary winding 112 caused by the controller 104 turning the switch 108 on, a positive flow of current flows from the secondary winding 114 through the filter 116 to provide power to the output and into the load 118. In response to the controller 104 turning the switch 108 off, forward current flow through the primary winding 112 ceases as well as forward current flow from the secondary winding 114 to the filter 116. Energy stored in the inductor of the filter 116 during current flow from the secondary winding 114 is released after the forward current flow falls below a threshold, and the released energy causes additional current to flow forward to provide power to the output and into the load 118.

In the circuit setup illustrated in FIG. 1, the current flowing through the primary winding 112 when the switch 108 is in the on state has a flow path to follow. For example, the current flowing from the power supply 102 and though the primary winding 112 returns to the power supply 102 through the switch 108. However, when the switch 108 is controlled into its off state, residual energy stored in the primary winding 112 can subject the switch 108 to high voltage levels (e.g., at least $2V_{in}$) and lacks a flow path for sufficient dissipation before a next on-off cycle is begun. Accordingly, repeated on-off cycles of the forward converter 100 can cause the transformer 110 to saturate and can cause the switch 108 to be subjected to undesirable high voltage stresses.

Figure 2:
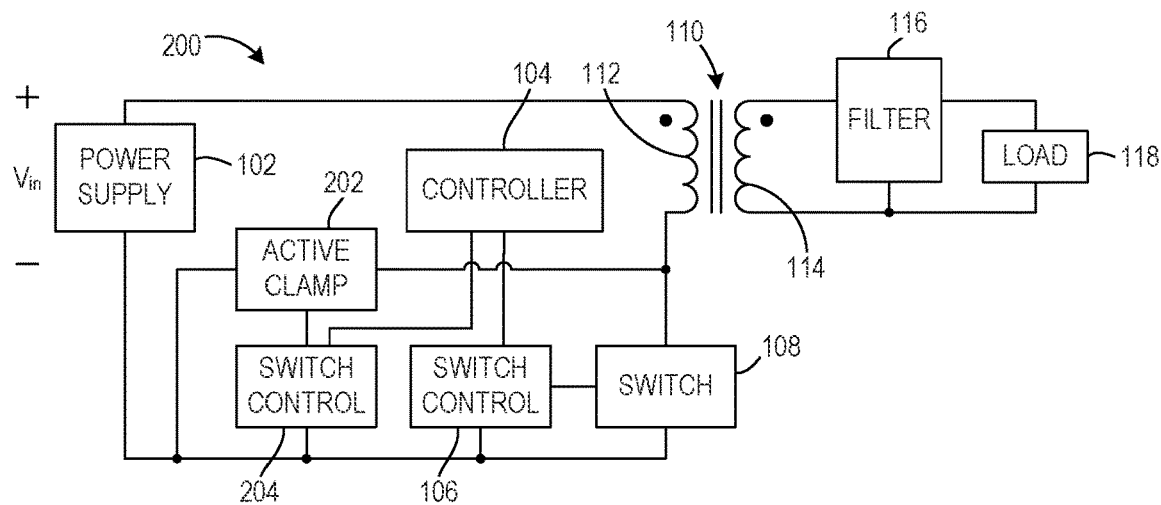
FIG. 2 illustrates a schematic block diagram of the forward converter of FIG. 1 with a low side active clamp.

One example of handling the transformer residual energy to reduce saturation is illustrated in FIG. 2, which shows a schematic block diagram of a forward converter 200 including components of the forward converter 100 of FIG. 1 with an active clamp 202. The active clamp 202 includes a controlled switch such as a transistor (e.g., a MOSFET) and includes a capacitor. A clamp switch control 204 is coupled to the active clamp 202 and to the controller 104 and includes, in one example, an operational amplifier coupled to the transistor of the active clamp 202. As illustrated in FIG. 2, the active clamp 202 is a low-side active clamp coupled in parallel with the switch 108. In the low-side active clamp configuration, the transistor in the active clamp 202 can be a p-channel transistor. Control of the active clamp 202 into an on state during the off state of the switch 108 resets the magnetizing current in the primary winding 112 to a level substantially equal to the level of the magnetizing current at the start of the switching period.

Figure 3:
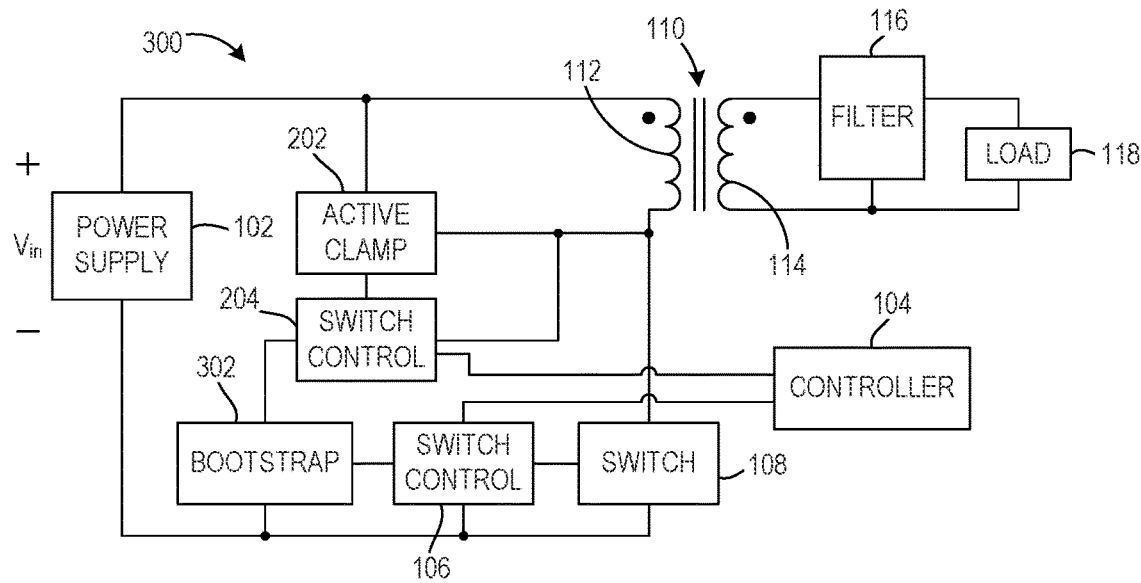
FIG. 3 illustrates a schematic block diagram of the forward converter of FIG. 1 with a high side active clamp.

In another example of handling the transformer residual energy of the forward converter 100 of FIG. 1 to reduce saturation, FIG. 3 illustrates a forward converter 300 in a high-side active clamp configuration in which the active clamp 202 is coupled in parallel with the primary winding 112 of the transformer 110. In this configuration, the transistor in the active clamp 202 can be an n-channel transistor. In addition, a gate voltage for the transistor of at least Vin (voltage of the power supply 102)+Vth (threshold voltage of the n-channel transistor) is used to control the transistor into its on state. Accordingly, FIG. 3 illustrates a bootstrap circuit 302 configured to provide a stepped-up voltage.

Figure 4:
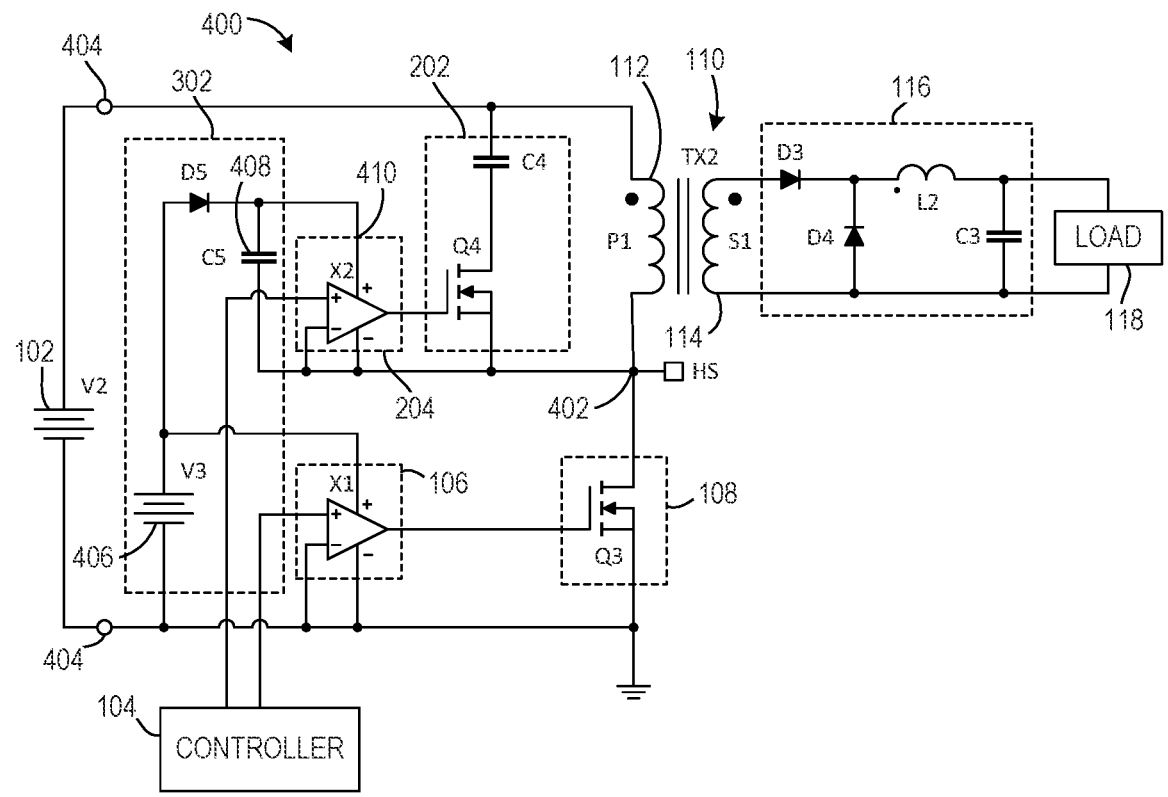
FIG. 4 illustrates a schematic diagram of the forward converter of FIG. 3.

FIG. 4 illustrates an exemplary schematic diagram of a forward converter circuit 400 of the forward converter 300 of FIG. 3. An operation of the forward converter circuit 400 according to an example will now be discussed. In a first portion of a switching cycle of the forward converter circuit 400, the controller 104 commands the switch control 106 to supply a gate-on voltage to the gate of the MOSFET 108, switching it into an on state. In addition, the controller 104 commands the clamp switch control 204 to supply a gate-off voltage to the gate of the MOSFET Q4 of the active clamp 202, switching it into an off state. In this mode, the voltage ($V_{ds}$) across the MOSFET 108 is pulled to ground (or substantially to ground due to non-idealities of the MOSFET 108), and a low-side node 402, therefore, becomes zero volts (i.e., ground). Accordingly, a voltage, $V_{p1}$, across the primary winding 112 of the transformer 110 is formed as a first forward current from the power supply 102 connected to a voltage input 404 flows through the primary winding 112. In response, a second forward current is induced in the secondary winding 114 of the transformer 110, which flows through the diode D3 and into the LC circuit formed by inductor L2 and capacitor C3 to provide power to the load 118. The second forward current reverse biases the diode D4, which prevents the second forward current from bypassing the LC circuit. With the low-side node 402 at ground, a voltage from an internal power supply 406 of the bootstrap circuit 302 charges a bootstrap voltage storage device 408 (e.g., capacitor C5) through a diode D5 to a boost voltage value, $V_{boot}$. To avoid damage to the MOSFET Q4 of the active clamp 202 due to exceeding a $V_{GS}$ rating of the MOSFET Q4, the voltage of the internal power supply 406 is lower than the voltage, $V_{in}$, of the power supply 102.

In a second portion of a switching cycle of the forward converter circuit 400, the controller 104 commands the switch control 106 to supply a gate-off voltage to the gate of the MOSFET 108, switching it into an off state. Accordingly, the low-side node 402 reaches or approaches a voltage level equal to the voltage, $V_{in}$, of the power supply 102. As a result, further charging of the bootstrap voltage storage device 408 is halted. However, when the controller 104 commands the clamp switch control 204 to turn on the MOSFET Q4, the energy stored in the bootstrap voltage storage device 408 is supplied to a voltage input 410 of the clamp switch control 204 to drive the gate of MOSFET Q4. Turning on MOSFET Q4 allows the residual energy stored in the primary winding 112 to dissipate into capacitor C4 of the active clamp 202.

While incorporation of the bootstrap circuit 302 into the high-side active clamp configuration allows operation of the active clamp 202 and clamp switch control 204 to reduce transistor saturation in an ideal state, non-ideal aspects of the components of the forward converter circuit 400 can still lead to transformer saturation and other undesirable results. For example, in one operating scenario where the duty cycle of the MOSFET 108 is increased from zero to a desired operating value in a step-by-step manner, the charging of the bootstrap voltage storage device 408 is also charged in a step-by-step manner. During the first few cycles, the capacitor voltage value, $V_{boot}$, can be less than the operating threshold voltage of the clamp switch control 204 (e.g., operational amplifier X2). While $V_{boot}$ is be less than the operating threshold voltage, the MOSFET Q4 cannot be switched to its on state, resulting in the forward converter circuit 400 operating in the first quadrant (similar to forward converter 100 of FIG. 1). As such, a higher voltage stress on the primary MOSFET Q3 (e.g., switch 108) can result as well as a high flux density on the transformer 110.

In another example, operation of the forward converter circuit 400 in a burst mode or pulse skipping mode for light loads reduces the duty cycle of the primary MOSFET Q3. As in the previous example, short duty cycles on the MOSFET Q3 results in less time for charging the bootstrap voltage storage device 408. Accordingly, energy discharge of the bootstrap voltage storage device 408 through the clamp switch control 204 and MOSFET Q4 is not replenished when the MOSFET Q3 is activated into its on state. Thus, undesirable results similar to the previous example by be experienced.

In yet another example, at a load transient condition during which the load changes from a light load to a heavy load, the output voltage tends to drop very fast while the duty cycle of the MOSFET Q3 is increased quickly to attempt to maintain stability of the output power. The fast duty cycle increase causes higher energy stored in leakage inductance. The energy causes higher voltage stress on both primary and secondary MOSFETs Q3, Q4. Furthermore, the bootstrap voltage storage device voltage may not be able to be quickly charged during the fast duty cycle due to a high capacitance value, for example. As a result, the forward converter circuit 400 operates at first quadrant similar to the other examples.

Figure 5:
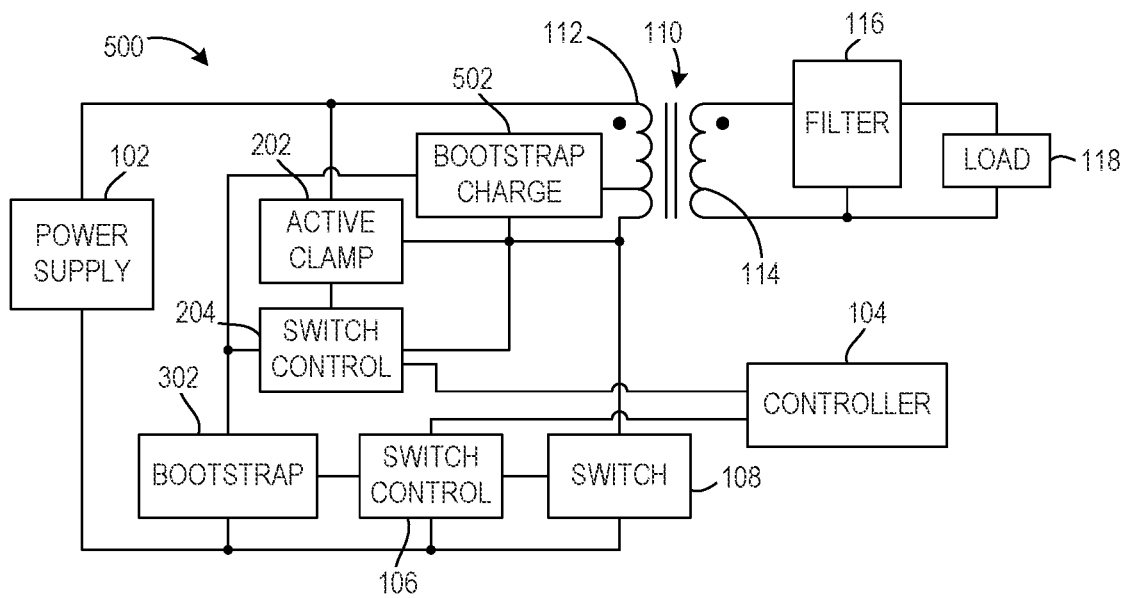
FIG. 5 illustrates an exemplary schematic block diagram of the forward converter of FIG. 1 with a high side active clamp.

FIG. 5 illustrates an exemplary schematic block diagram of a forward converter 500 configured to improve bootstrap voltage storage device charge to reduce effects outlined in the aforementioned examples. Forward converter 500 includes components similar to those of the forward converter circuit 400 and further includes a bootstrap charge circuit 502 designed to shorten the charging time of the voltage storage device in the bootstrap circuit 302 to reduce high voltage stress experienced by the switch 108.

Figure 6:
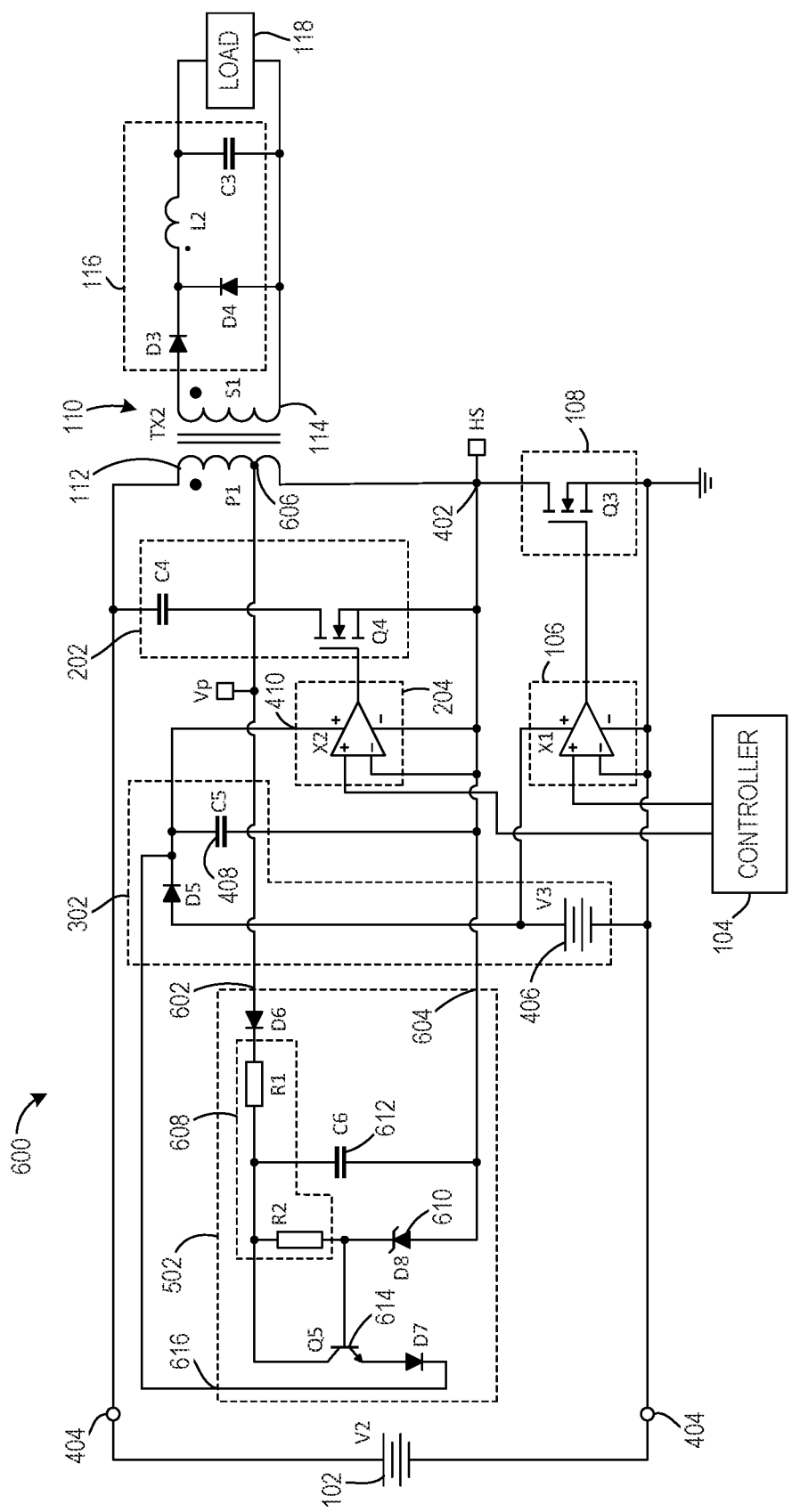
FIG. 6 illustrates an exemplary schematic diagram of the forward converter of FIG. 5.

FIG. 6 illustrates an exemplary schematic diagram of a forward converter circuit 600 of the forward converter 500 of FIG. 5. As shown, bootstrap charge circuit 502 includes voltage inputs 602, 604 coupled in parallel across a tap 606 of the primary winding 112 of the transformer 110 and the low-side node 402. In one embodiment, the tap 606 is positioned such that a voltage generated across the voltage inputs 602, 604 of the bootstrap charge circuit 502 is lower than the voltage, $V_{in}$, of the power supply 102 but a higher voltage than the voltage, $V_{V3}$, of the internal power supply 406. When the MOSFET Q3 is on and forward current flow from the power supply 102 is flowing through the primary winding 112 during the first portion of a switching cycle, the tap 606 provides a voltage, $V_p$, to the voltage input 602 and to a resistor network 608 including resistors R1 and R2 coupled to a voltage reference device 610 such as Zener diode D8. A charge voltage storage device 612 (e.g., charge capacitor C6) is coupled in parallel across the resistor R2 and Zener diode D8. Both the charge capacitor C6 and the Zener diode D8 have one node coupled to the voltage input 604, which, when the MOSFET Q3 is on, is connected to ground. As such, the voltage provided to the resistor network 608 and voltage reference device 610 generates a charge voltage, $V_{charge}$, between resistors R1 and R2 that is stored in charge capacitor C6.

As described above, the coupling of the low-side node 402 to ground when the MOSFET Q3 is on allows the internal power supply 406 to charge the bootstrap voltage storage device 408 through the diode D5. Additional charging of the bootstrap voltage storage device 408 may be provided by the bootstrap charge circuit 502 during the MOSFET Q3 on time via a controlled switch 614 such as bipolar junction transistor (BJT) Q5. A voltage output 616 of the bootstrap charge circuit 502 is coupled to the bootstrap capacitor 408. When the BJT Q5 is saturated due to the reference voltage provided by voltage reference device 610, the voltage generated across resistor R2 and Zener diode D8 can be provided via the voltage output 616 to charge bootstrap voltage storage device 408 if it is higher than the voltage drop across diode D7 coupled to the bootstrap voltage storage device 408. The charging of the bootstrap voltage storage device 408 by both the internal power supply 406 and the bootstrap charge circuit 502 during the on state of the MOSFET Q3 allows the bootstrap voltage storage device 408 to be charged more quickly than by the internal power supply 406 alone.

When the MOSFET Q3 is off in the second portion of the switching cycle, the low-side node 402 is disconnected from ground, and, as described above, the bootstrap capacitor 408 is discharged by the clamp switch control 204. In addition, the bootstrap capacitor 408 is also charged by the charge voltage storage device 612 via the controlled switch 614 and the diode D7. In one embodiment, the capacitance of the capacitor C6 of the charge voltage storage device 612 is larger or higher than the capacitance of the capacitor C5 of the bootstrap capacitor 408. Accordingly, the voltage supplied to the clamp switch control 204 can be extended.

The addition of the bootstrap charge circuit 502 into the forward converter circuit 600 as described herein shortens the time at which capacitor C5 remains below the voltage threshold, $V_{th}$, of the clamp switch control 204. As such, the amount of time during which the switch 108 may be subjected to high voltage stress reduces. Thus, the voltage stress on the switch 108 becomes lower, which can lead to an extended life of the component.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A power supply comprising:
   a power supply voltage input;
   a transformer comprising a primary winding coupled to the power supply voltage input;
   a first switch coupled to the primary winding and to the power supply voltage input;
   an active clamp circuit coupled in parallel with the primary winding and comprising a second switch;
   a clamp switch control coupled to the second switch and comprising a voltage input;
   a bootstrap circuit coupled to the clamp switch control and comprising a bootstrap voltage storage device coupled to the voltage input of the clamp switch control;
   a charging circuit comprising:
      a first voltage input coupled to the primary winding;
      a voltage output coupled to the bootstrap voltage storage device;
      a resistor network configured to generate a charge voltage in response to an input voltage supplied to the first voltage input by the primary winding during a first portion of a switching cycle of the first switch; and
      a charge voltage storage device coupled to the resistor network and configured to:
         store at least a portion of the charge voltage during the first portion of the switching cycle; and
         supply the at least a portion of the charge voltage to the bootstrap voltage storage device via the voltage output during a second portion of the switching cycle.

2. The power supply of claim 1, wherein the charging circuit is configured to supply the charge voltage to the bootstrap voltage storage device during the first portion of the switching cycle.

3. The power supply of claim 2, wherein the bootstrap circuit further comprises an internal power supply coupled to the charge voltage storage device and configured to provide a power supply voltage to charge the bootstrap voltage storage device during the first portion of the switching cycle.

4. The power supply of claim 3, wherein the power supply voltage is less than the input voltage.

5. The power supply of claim 1, wherein the charging circuit further comprises:
   a second voltage input coupled to a low-side node coupled between the primary winding and the first switch; and
   a voltage reference device coupled between the resistor network and the second voltage input.

6. The power supply of claim 5, wherein the voltage reference device comprises a Zener diode.

7. The power supply of claim 1, further comprising:
   a first switch control coupled to the first switch;
   a second switch control coupled to the second switch; and
   a controller coupled to the first and second switch controls and configured to:
      cause the first switch control to control the first switch into an on state during the first portion of the switching cycle;
      cause the second switch control to control the second switch into an off state during the first portion of the switching cycle;
      cause the first switch control to control the first switch into an off state during the second portion of the switching cycle; and
      cause the second switch control to control the second switch into an on state during the second portion of the switching cycle.

8. The power supply of claim 1, wherein the transformer further comprises a secondary winding; and
   wherein the power supply further comprises a filter coupled to the secondary winding and configured to provide an output voltage to a load, the output voltage proportional to an input power supply voltage provided to the power supply voltage input.

9. The power supply of claim 8, wherein the filter comprises:
   a pair of diodes;
   an inductor; and
   a capacitor.

10. The power supply of claim 1, wherein the bootstrap voltage storage device comprises a capacitor; and
    wherein the charge voltage storage device comprises a capacitor.

11. The power supply of claim 10, wherein the bootstrap voltage storage device has a greater capacitance than the charge voltage storage device.

12. A charging circuit for an active clamp forward converter, the active clamp forward converter comprising an active switch coupled to a primary winding of a transformer, a filter circuit coupled to a secondary winding of the transformer, a high-side active clamp coupled in parallel with the primary winding, a first switch control coupled to the active switch, a second switch control coupled to the high-side active clamp, and a bootstrap circuit coupled to the second switch control, the charging circuit comprising:
   a first voltage input coupled to the primary winding;
   a voltage output coupled to the bootstrap circuit;
   a resistor network configured to generate a charge voltage in response to an input voltage supplied to the first voltage input by the primary winding during a first portion of a switching cycle of the active switch; and
   a charge voltage storage device coupled to the resistor network and configured to:
      store at least a portion of the charge voltage during the first portion of the switching cycle; and
      supply the at least a portion of the charge voltage to the bootstrap circuit via the voltage output during a second portion of the switching cycle.

13. The charging circuit of claim 12, wherein the charging circuit is configured to supply the charge voltage to the bootstrap circuit during the first portion of the switching cycle.

14. The charging circuit of claim 12, wherein the charging circuit further comprises:
   a second voltage input coupled to the primary winding and the active switch; and
   a voltage reference device coupled between the resistor network and the second voltage input.

15. The charging circuit of claim 14, wherein the voltage reference device comprises a Zener diode.

16. An active clamp forward converter comprising:
   a first switch control coupled to a first active switch;
   a transformer comprising a primary winding coupled to the first active switch;
   an active clamp coupled in parallel with the primary winding;
   a second switch control coupled to the active clamp;

a bootstrap circuit coupled to the second switch control; and a charging circuit comprising:
- a first voltage input coupled to the primary winding;
- a voltage output coupled to the bootstrap circuit;
- a resistor network configured to generate a charge voltage in response to an input voltage supplied to the first voltage input by the primary winding during a first portion of a switching cycle of the first active switch; and
- a charge voltage storage device coupled to the resistor network and configured to:
  - store at least a portion of the charge voltage during the first portion of the switching cycle; and
  - supply the at least a portion of the charge voltage to the bootstrap circuit via the voltage output during a second portion of the switching cycle.

17. The active clamp forward converter of claim 16, wherein the charging circuit is configured to supply the charge voltage to the bootstrap circuit during the first portion of the switching cycle.

18. The active clamp forward converter of claim 16, wherein the bootstrap circuit comprises a capacitor configured to provide a supply voltage to the second switch control; and
wherein the charge voltage storage device, in being configured to supply the at least a portion of the charge voltage, is configured to supply the at least a portion of the charge voltage to the capacitor.

19. The active clamp forward converter of claim 16, wherein the charging circuit further comprises:
- a second voltage input coupled to the primary winding and the first active switch; and
- a voltage reference device coupled between the resistor network and the second voltage input.

20. The active clamp forward converter of claim 16, wherein the bootstrap circuit comprises a second active switch; and
further comprising a controller coupled to the first and second switch controls and configured to:
- cause the first switch control to control the first active switch into an on state during the first portion of the switching cycle;
- cause the second switch control to control the second active switch into an off state during the first portion of the switching cycle;
- cause the first switch control to control the first active switch into an off state during the second portion of the switching cycle; and
- cause the second switch control to control the second active switch into an on state during the second portion of the switching cycle.

* * * * *